United States Patent
Ueda et al.

(10) Patent No.: US 11,187,624 B2
(45) Date of Patent: Nov. 30, 2021

(54) TIRE HOLDING MECHANISM AND TIRE TEST DEVICE

(71) Applicants: MITSUBISHI HEAVY INDUSTRIES MACHINERY SYSTEMS, LTD., Kobe (JP); BRIDGESTONE CORPORATION, Tokyo (JP)

(72) Inventors: Tatsuya Ueda, Kobe (JP); Jiro Agawa, Kobe (JP); Makoto Tachibana, Kobe (JP)

(73) Assignees: MITSUBISHI HEAVY INDUSTRIES MACHINERY SYSTEMS, LTD., Kobe (JP); BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/970,456

(22) PCT Filed: Feb. 21, 2018

(86) PCT No.: PCT/JP2018/006201
§ 371 (c)(1),
(2) Date: Aug. 17, 2020

(87) PCT Pub. No.: WO2019/163019
PCT Pub. Date: Aug. 29, 2019

(65) Prior Publication Data
US 2020/0378868 A1   Dec. 3, 2020

(51) Int. Cl.
*G01M 17/02* (2006.01)
*B29D 30/00* (2006.01)

(52) U.S. Cl.
CPC ....... *G01M 17/021* (2013.01); *B29D 30/0061* (2013.01); *B29D 2030/0066* (2013.01)

(58) Field of Classification Search
None
See application file for complete search history.

(56) References Cited

U.S. PATENT DOCUMENTS

| | | |
|---|---|---|
| 5,107,702 A | 4/1992 | Iwama |
| 6,131,455 A | 10/2000 | Matsumoto et al. |
| | (Continued) | |

FOREIGN PATENT DOCUMENTS

| | | |
|---|---|---|
| EP | 1746400 A1 | 1/2007 |
| JP | H03-188348 A | 8/1991 |
| | (Continued) | |

OTHER PUBLICATIONS

PCT/ISA/210, "International Search Report for International Application No. PCT/JP2018/006201," May 22, 2018.

(Continued)

*Primary Examiner* — Andre J Allen
*Assistant Examiner* — Jermaine L Jenkins
(74) *Attorney, Agent, or Firm* — Manabu Kanesaka; Kenneth Berner; Benjamin Hauptman

(57) ABSTRACT

The present invention includes a shaft that protrudes further toward a lower spindle side than an upper rim and includes a plurality of engagement grooves arranged in an up-down direction at an outer periphery of a lower end accommodated in a hollow portion of the lower spindle; a shaft support part that rotatably supports an upper end of the shaft; an engagement part that is accommodated within the hollow portion and is engaged with any one engagement groove of the plurality of engagement grooves; a first elevating part that is configured to integrally move the upper spindle, the shaft, and the shaft support part in the up-down direction; and a second elevating part that adjusts the length of the shaft protruding below the upper rim by changing the distance between the shaft support part and the upper spindle.

6 Claims, 5 Drawing Sheets

(56) References Cited

U.S. PATENT DOCUMENTS

| | | | |
|---|---|---|---|
| 6,308,566 B1 * | 10/2001 | Matsumoto | G01M 1/326 |
| | | | 73/462 |
| 7,340,947 B2 * | 3/2008 | Shinomoto | G01M 1/045 |
| | | | 73/146 |
| 9,579,930 B2 * | 2/2017 | Seimoto | B29D 30/72 |
| 10,295,429 B2 * | 5/2019 | Ueda | G01M 1/16 |
| 10,760,903 B2 * | 9/2020 | Nishihara | G01M 17/02 |

FOREIGN PATENT DOCUMENTS

| | | |
|---|---|---|
| JP | H07-027649 A | 1/1995 |
| JP | 3040514 B2 | 5/2000 |
| JP | 3418512 B2 | 6/2003 |
| JP | 3427948 B2 | 7/2003 |
| JP | 3779678 B2 | 5/2006 |
| JP | 2006-145297 B2 | 6/2006 |
| JP | 3904318 B2 | 4/2007 |

OTHER PUBLICATIONS

PCT/ISA/237, "Written Opinion of the International Searching Authority for International Application No. PCT/JP2018/006201," May 22, 2018.

\* cited by examiner

TIRE HOLDING MECHANISM AND TIRE TEST DEVICE

RELATED APPLICATIONS

The present application is National Phase of International Application No. PCT/JP2018/006201 filed Feb. 21, 2018, the disclosure of which is hereby incorporated by reference herein in its entirety.

TECHNICAL FIELD

The present invention relates to a tire holding mechanism and a tire test device.

BACKGROUND ART

In the tire manufacturing process, various inspections are performed after a vulcanization step. As an inspection system that inspects a tire after the vulcanization step, for example, a tire uniformity machine for measuring non-uniformity of a tire, a dynamic balancing machine for measuring unbalance of a tire, and the like are known.

In the case of a tire test device such as the tire uniformity machine or the dynamic balancing machine, an inspection is performed by rotating the tire in a state where the tire is held using a tire holding mechanism.

In this case, the tire is fixed in a state where the tire is sandwiched between an upper rim and a lower rim from both sides in the width direction of the tire.

Meanwhile, there are a plurality of types of tires, and even if the tires have the same bead diameter, the width of the tires vary depending on the type. For this reason, it is necessary to adjust the distance between the upper rim attached to an upper spindle and the lower rim attached to a lower spindle according to the width of the tire to be inspected.

As the tire test device including the tire holding mechanism capable of adjusting the distance between the upper rim and the lower rim, for example, there is a uniformity test device (tire test device) disclosed in Patent Document 1.

Patent Document 1 discloses that a locking shaft is fixed to a lower spindle by engagement between an engaging portion attached within the lower spindle and an engaged portion provided in the locking shaft, a plurality of engaged portions are arranged in an axial direction of the locking shaft, and the distance between the upper rim and the lower rim is varied depending on which engaged portion is engaged with the engaging member.

CITATION LIST

Patent Literature

Patent Document 1

Japanese Patent Publication No. 3904318

SUMMARY OF INVENTION

Technical Problem

Meanwhile, in the uniformity test device disclosed in Patent Document 1, in a case where tires having the same bead diameter and having a width that is difficult to handle at an engagement position between the engaged portion and the engaging member were held, it was necessary to replace the upper rim and the lower rim with those having different heights. For this reason, there is a possibility that the frequency of replacement work of the upper rim and the lower rim may increase.

Thus, an object of the present invention is to provide a tire holding mechanism and a tire test device capable of reducing the replacement frequency of an upper rim and a lower rim when a plurality of tires having the same head diameter and different widths are held between the upper rim and the lower rim.

Solution to Problem

In order to solve the above problem, a tire holding mechanism according to one aspect of the present invention includes an upper spindle that rotatable supports an upper rim abutting against one opening side of a tire from above the upper rim; a lower spindle that abuts against the other opening side of the tire, rotatable supports a lower rim holding the tire together with the upper rim, and has a hollow portion formed therein; a shaft that passes through the upper spindle, extends in an up-down direction of the upper spindle, protrudes further toward the lower spindle side than the upper rim, and includes a plurality of engagement grooves formed in the up-down direction at an outer periphery of a lower end accommodated in the hollow portion; a shaft support part that rotatable supports an upper end of the shaft and extends to an outside of the shaft; an engagement part that is provided at the lower spindle in a state of being accommodated within the hollow portion and is engaged with any one engagement groove of the plurality of engagement grooves; a first elevating part that is configured to integrally move the upper spindle, the shaft, and the shaft support part in the up-down direction; and a second elevating part that is configured to adjust a length of the shaft protruding below the upper rim by changing a distance between the shaft support part and the upper spindle in the up-down direction.

According to the present invention, by having the second elevating part that is configured to adjust the length of the shaft protruding below the upper rim by changing the distance between the shaft support part and the upper spindle in the up-down direction in addition to the first elevating part that raises and lower the structure including the upper spindle, the shaft support part, and the shaft in the up-down direction, it is possible to change the length of the shaft protruding below the upper rim without increasing the length of the shaft.

Accordingly, since it is possible to hold a wide tire having the same bead diameter, which is difficult to cope with only with the first elevating part without replacing the upper rim and the lower rim, the replacement frequency of the upper rim and the lower rim can be reduced.

Additionally, the tire holding mechanism according to the aspect of the present invention may further include a spindle support part that is provided below the shaft support part, rotatable supports the upper spindle and the shaft, and has a wider shape than the upper spindle, and the second elevating part may be provided between an outer peripheral portion of the shaft support part and the spindle support part, and is configured to change positions of the spindle support part and the upper spindle with respect to the shaft support part in the up-down direction.

In this way, the second elevating part provided between the outer peripheral portion of the shaft support part and the spindle support part changes positions of the spindle support part and the upper spindle with respect to the shaft support part in the up-down direction, so that the length of the shaft protruding below the upper rim can be changed without increasing the length of the shaft.

Additionally, in the tire holding mechanism according to the aspect of the present invention, the second elevating part may include a piston, a piston rod provided with the piston, and a plurality of cylinders having a cylinder body that accommodates a portion of the piston rod provided with the piston, and a tip portion of the piston rod may be fixed to a lower surface side of an outer peripheral portion of the shaft support part, and an end of the cylinder body may be fixed to an upper surface side of an outer peripheral portion of the spindle support part.

In this way, as the second elevating part includes the plurality of cylinders, and the tip portion of the piston rod is fixed to the surface of the outer peripheral portion of the shaft support part, and the end of the cylinder body is fixed to the upper surface of the outer peripheral portion of the spindle support part, the length of the shaft protruding below the upper rim can be increased without changing the height of the upper surface of the shaft support part.

Additionally, in the tire holding mechanism according to the aspect of the present invention, at least a portion of the piston rod may protrude from the cylinder body, an outer peripheral surface of a portion of the shaft may be exposed between the shaft support part and the spindle support part, and a spacer is disposed on an outer peripheral surface of the shaft disposed between the shaft support part and the spindle support part.

By disposing the spacer having such a configuration on the outer peripheral surface of the shaft exposed between the shaft support part and the spindle support part, the distance between the spindle support part and the shaft support part can be kept constant and accurate.

Additionally, in the tire holding mechanism according to the aspect of the present invention, the spacer may include a plurality of split bodies.

In this way, as the spacer includes the plurality of split bodies, the spacer can be easily attached to the shaft from the outside of the shaft, and can be easily removed from the shaft.

Additionally, by shortening the distance between the shaft support part, and the spindle support part and the upper spindle after the spacer (split body) is removed from the shaft in a state where the engagement groove formed at the bottom of the shaft and the engagement part are engaged with each other, the length of the shaft disposed below the upper rim can be increased.

Additionally, a tire test device according to one aspect of the present invention may include the above tire holding mechanism and the measurement unit that is configured to measure characteristics of the tire held between the upper rim and the lower rim.

In this way, by including the tire holding mechanism and the measurement unit that measures the characteristics of the tire, when the plurality of tires having the same bead diameter and different widths are held between the upper rim and the lower rim, the replacement frequency of the upper rim and the lower rim can be reduced. Thus, the characteristics of the tires can be efficiently measured.

Advantageous Effects of Invention

According to the present invention, when the plurality of tires having the same bead diameter and different widths are held between the upper rim and the lower rim, the replacement frequency of the upper rim and the lower rim can be reduced.

DESCRIPTION OF EMBODIMENTS

Hereinafter, embodiments to which the present invention is applied will be described in detail with reference to the drawings.

Embodiments

Figure 1:
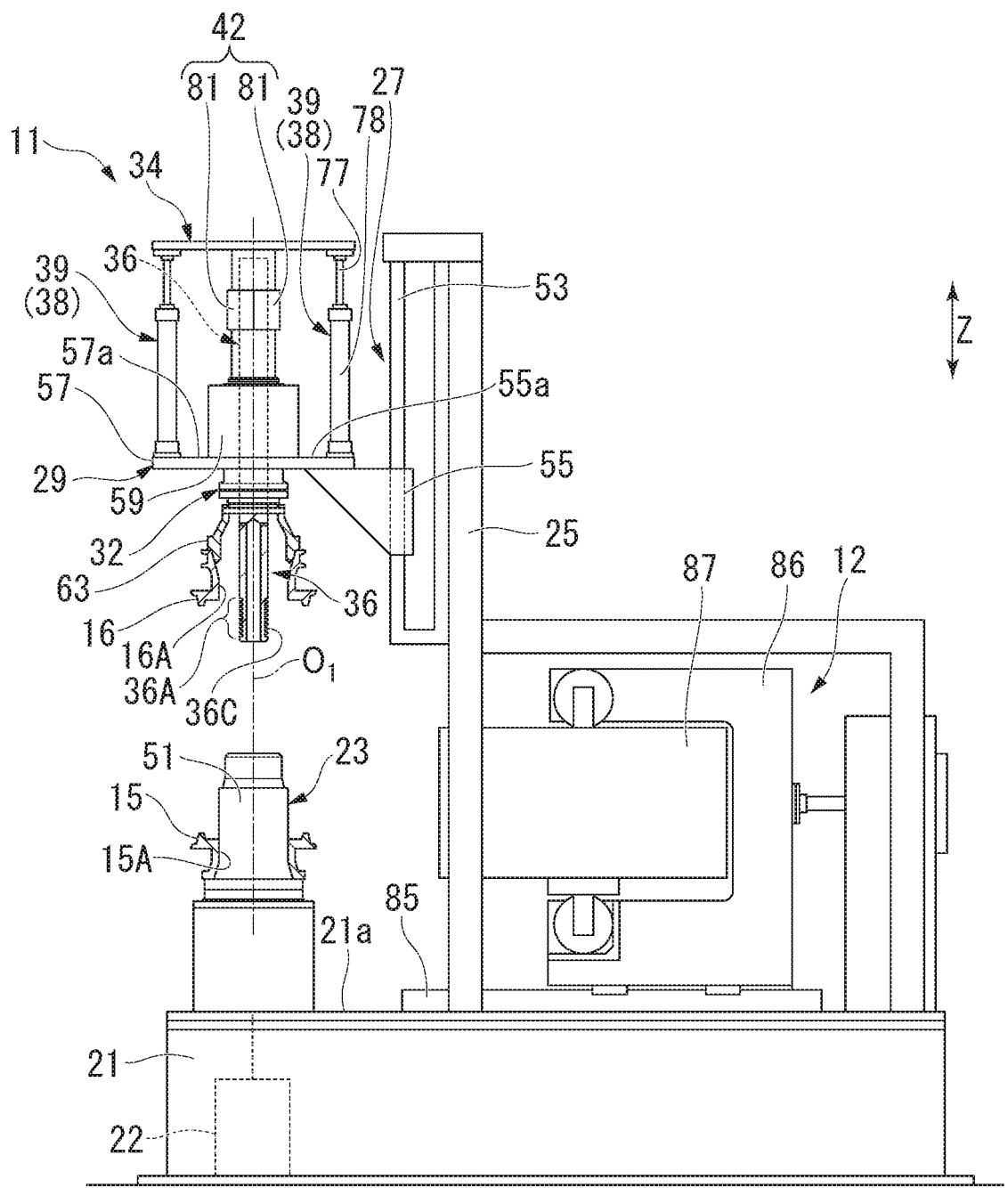
FIG. 1 is a side view showing a schematic configuration of a tire test device according to an embodiment of the present invention.

A tire test device 10 according to an embodiment of the present invention will be described with reference to FIGS. 1 to 4. In FIG. 1, only a lower rim 15, an upper rim 16, and a rim holding part 63 are shown in cross section for convenience of description. $O_1$ shown in FIG. 1 indicates an axis (hereinafter, referred to as "axis $O_1$") of a shaft 36, and a Z direction indicates an up-down direction (vertical direction).

Figure 2:
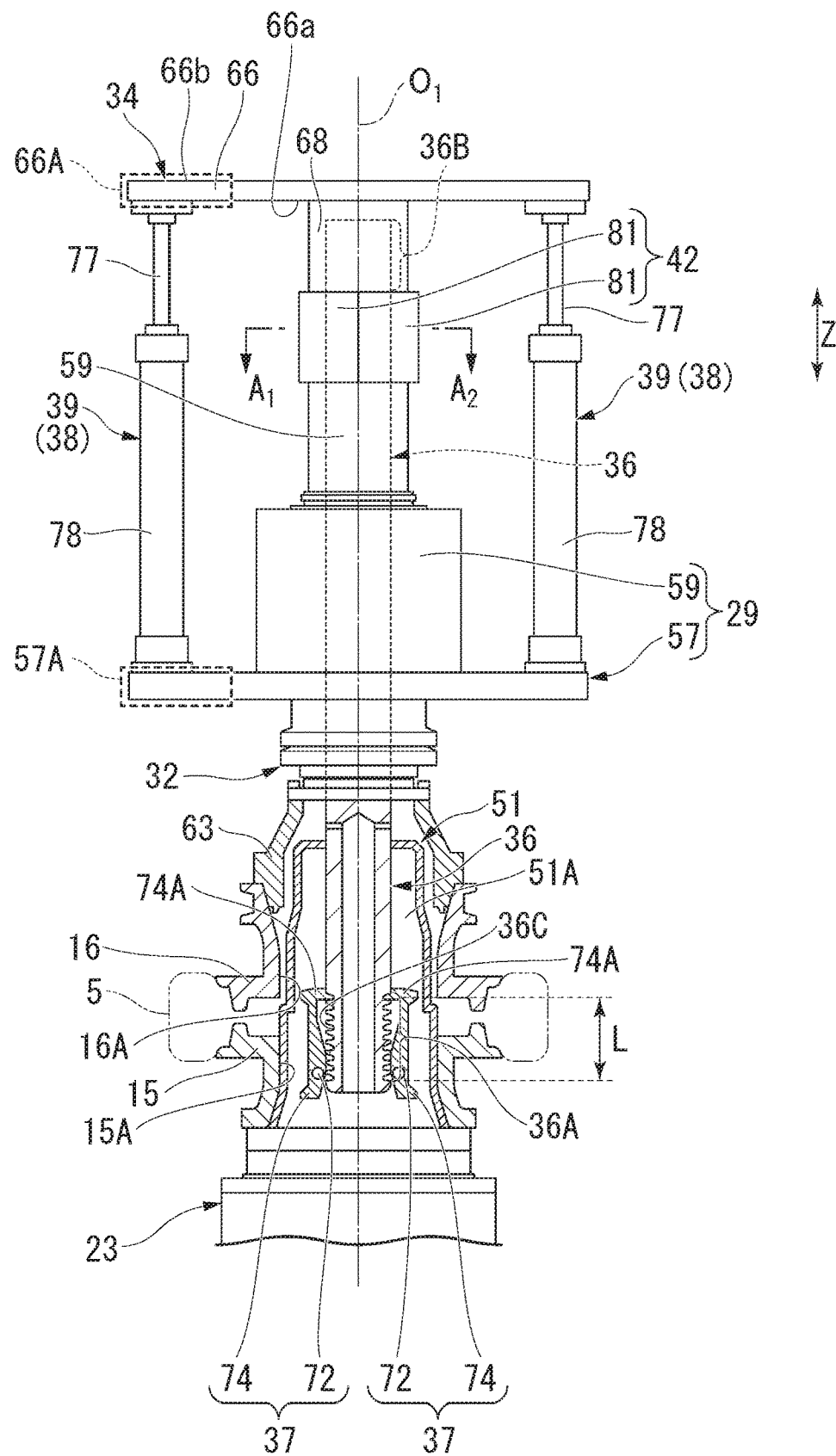
FIG. 2 is a view showing a state where a tire holding mechanism shown in FIG. 1 holds a narrowest among tires capable of being held by operating only a first elevating part, and is a partially enlarged view of the tire holding mechanism.

FIG. 2 shows a state where an engagement part 37 is engaged with an engagement groove 36C formed at the top among a plurality of engagement grooves 36C formed in the shaft 36. FIG. 2 shows a state where a tire holding mechanism 11 holds a narrowest tire 5 among tires capable of being held by the operation of only a first elevating part 27. Additionally, in FIG. 2, for convenience of description, a lower portion of the tubular part 51 and a lower portion of the shaft 36 are shown in cross section.

L shown in FIG. 2 indicates a distance (hereinafter, referred to as a "distance L") between an engagement groove 36C formed at the bottom of the shaft 36 and the engagement groove 36C formed at the top. In FIG. 2, the same components as those of the structure shown in FIG. 1 are denoted by the same reference signs.

Figure 3:
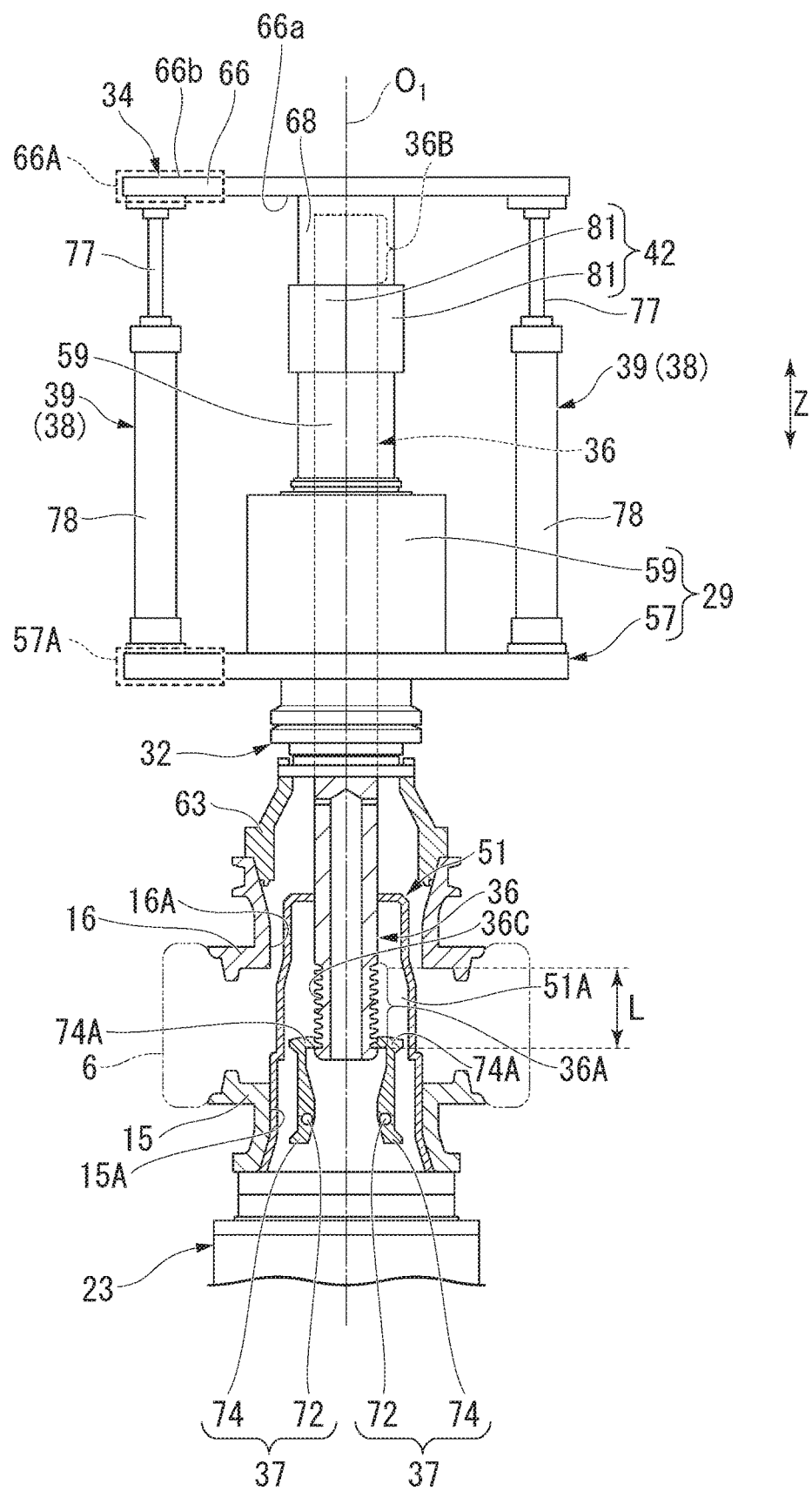
FIG. 3 is a view showing a state where the tire holding mechanism shown in FIG. 1 holds a widest tire among the tires capable of being held by operating only the first elevating part, and is a partially enlarged view of the tire holding mechanism.

FIG. 3 shows a state where the engagement part 37 is engaged with the engagement groove 36C formed at the bottom among the plurality of engagement grooves 36C formed in the shaft 36.

FIG. 3 shows a state where the tire holding mechanism 11 holds a widest tire 6 among the tires capable of being held by the operation of only the first elevating part 27. In FIG. 3, the same components as those of the structure shown in FIG. 2 are denoted by the same reference signs.

Figure 4:
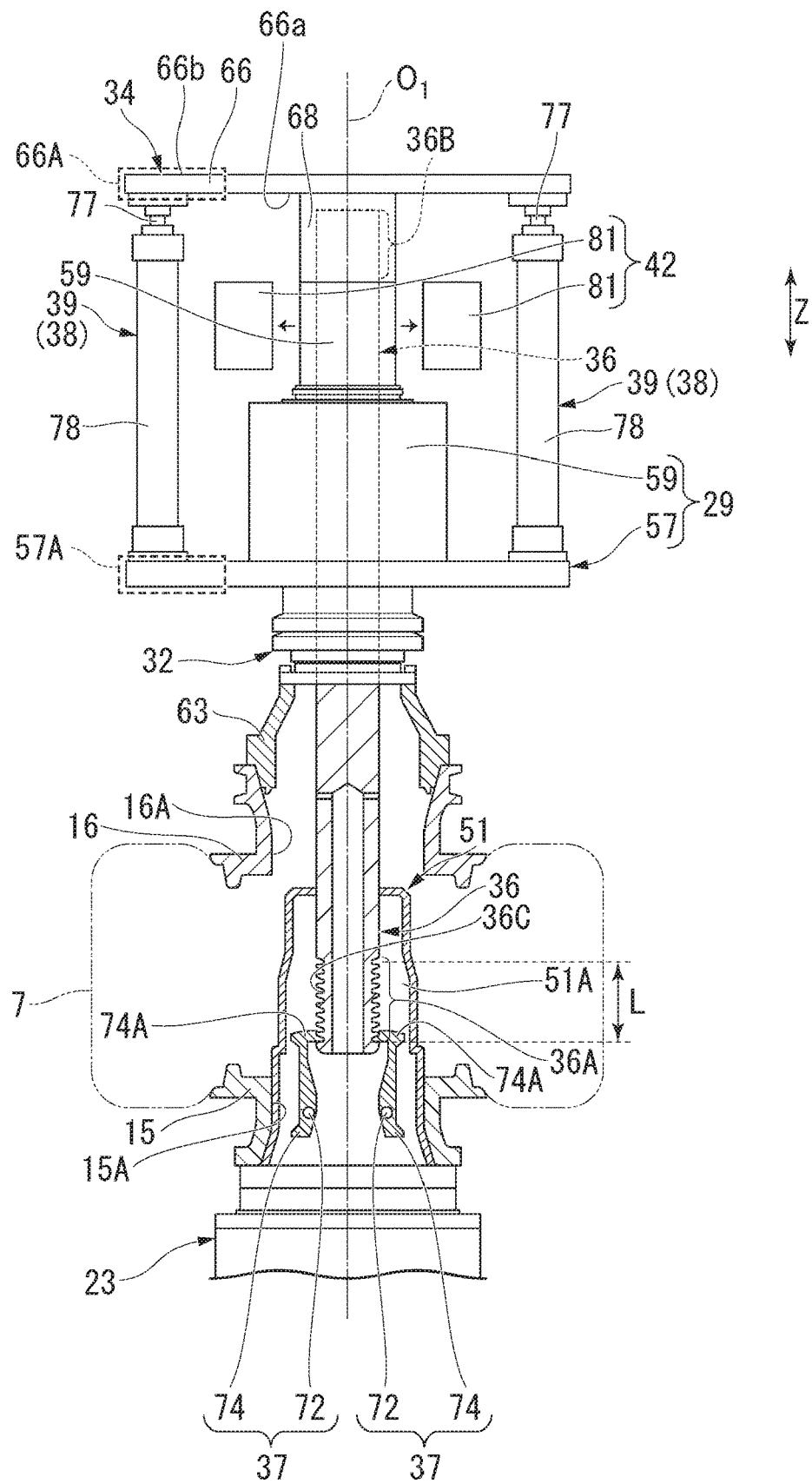
FIG. 4 is a view showing a state where the tire holding mechanism shown in FIG. 1 holds the widest tire among the tires capable of being held by operating first and second elevating parts, and is a partially enlarged view of the tire holding mechanism.

FIG. 4 shows a state where the engagement part 37 is engaged with the engagement groove 36C formed at the bottom among the plurality of engagement grooves 36C formed in the shaft 36.

FIG. 4 shows a state where the tire holding mechanism 11 holds a widest tire 7 among tires capable of being held by the operations of first and second elevating parts 27 and 38. Two arrows shown in FIG. 4 indicate movement directions of split bodies 81. In FIG. 4, the same components as those of the structure shown in FIGS. 2 and 3 are denoted by the same reference signs.

The tires 5 to 7 are tires having the same bead diameter and different widths.

The tire test device 10 includes the tire holding mechanism 11 and a measurement unit 12.

The tire holding mechanism 11 has a base 21, a servo motor 22, a lower spindle 23, a post 25, a first elevating part 27, a spindle support part 29, an upper spindle 32, a shaft support part 34, a shaft 36, an engagement part 37, an engagement part revolving unit (not shown), a second elevating part 38, a spacer 42, and a spacer opening/closing mechanism (not shown).

The base 21 is a pedestal extending in a horizontal plane direction orthogonal to the Z direction.

The servo motor 22 is accommodated within the base 21. The servo motor 22 is connected to the lower spindle 23 in a state where the lower spindle 23 can be rotated.

The lower spindle 23 is provided on the base 21. The lower spindle 23 has the tubular part 51 that restricts the position of the lower rim 15 by being inserted into a through portion 15A of the lower rim 15. A hollow portion 51A is formed inside the tubular part 51. The tubular part 51 protrudes above the lower rim 15 in a state where the lower rim 15 is mounted.

The lower spindle 23 having the above configuration is rotated by the servo motor 22 in a state where a tire (any one tire of the tires 5 to 7) is sandwiched between the upper rim 16 and the lower rim 15 and the lower end 36A of the shaft 36 inserted into the hollow portion 51A and the engagement part 37 are engaged with each other (a state shown in FIGS. 2 to 4).

The post 25 is provided on the base 21. The post 25 extends upward from an upper surface 21a of the base 21.

The first elevating part 27 has a ball screw 53 and a rim elevator 55.

The ball screw 53 is provided at an upper portion of the post 25 and extends in the Z direction.

The rim elevator 55 is attached to the ball screw 53. Accordingly, the rim elevator 55 is configured to be movable in the Z direction.

The rim elevator 55 has an upper surface 55a to which a portion of the spindle support part 29 is fixed.

In addition, the first elevating part 27 may be configured by using the ball screw 53 and a slide rail (not shown) together.

The spindle support part 29 has a wider shape than the upper spindle 32, and includes a plate part 57 and a rotation support part 59.

A portion of the plate part 57 is fixed in contact with the upper surface 55a of the rim elevator 55. Accordingly, when the rim elevator 55 moves in the Z direction, the plate part 57 moves in the Z direction together with the rim elevator 55.

The rotation support part 59 is provided on an upper surface 57a side of a central portion of the plate part 57. The rotation support part 59 protrudes upward from the upper surface 57a of the plate part 57.

The rotation support part 59 has a bearing (not shown) that supports the shaft 36 disposed so as to pass through the spindle support part 29 in the Z direction so as to be rotatable around the axis $O_1$.

The spindle support part 29 having the above configuration fixes a fixed portion (a non-rotating upper portion) of the upper spindle 32 in a state where a rotating portion (a rotating lower portion) of the upper spindle 32 protrudes below the plate part 57. Accordingly, the spindle support part 29 supports the upper spindle 32. Therefore, when the spindle support part 29 moves in the Z direction, the upper spindle 32 also moves in the Z direction together with the spindle support part 29.

The upper spindle 32 has a rim holding part 63 that holds the upper rim 16 (a portion of the rotating portion). The rim holding part 63 is disposed to face the tubular part 51 in the Z direction.

The upper spindle 32 having the above configuration rotates together with the lower spindle in a state where any one of the tires 5 to 7 is sandwiched between the upper rim 16 and the lower rim 15 and the lower end 36A of the shaft 36 inserted into the hollow portion 51A and the engagement part 37 are engaged with each other (in the state shown in FIGS. 2 to 4).

In this state, the upper rim 16 is in abutment with one opening of each of the tires 5 to 7. The lower rim 15 is in abutment with the other opening of each of the tires 5 to 7.

The shaft support part 34 has a plate part 66 and a rotation support part 68.

The plate part 66 is disposed above the spindle support part 29. The plate part 66 faces the spindle support part 29 in the Z direction. An outer peripheral portion 66A of die plate part 66 (an outer peripheral portion of the shaft support part 34) faces an outer peripheral portion 57A of the plate part 57 (an outer peripheral portion of the spindle support part 29). The plate part 57 is connected to the plate part 57 via the second elevating part 38.

The rotation support part 68 is provided on the lower surface 66a side of the central on of the plate part 66. The rotation support part 68 protrudes from the lower surface 66a of the plate part 66 in a direction toward the rotation support part 59. The rotation support part 68 is disposed apart from the rotation support part 59 in the Z direction.

The rotation support part 68 includes an accommodating portion (not shown) that accommodates an upper end 36B of the shaft 36, and a bearing (not shown) that is accommodated in the accommodating portion and rotatable supports the upper end 36B of the shaft 36.

The shaft 36 passes through a central portion of the spindle support part 29 and the upper spindle 32 in the Z direction in a state where the upper end 36B is rotatable supported by the rotation support part 68. The shaft 36 extends in the Z direction, and protrudes below a lower end of the upper rim 16 (to the lower spindle 23 side) held by the upper spindle 32.

The lower end 36A of the shaft 36 is disposed below the upper rim 16 held by the upper spindle 32. The plurality of engagement grooves 36C arranged in the Z direction are formed at outer periphery of the lower end 36A of the shaft 36.

The shaft 36 having the above configuration is not fixed to the spindle support pa 29 and the upper spindle 32. For this reason, the position of the shaft 36 in the Z direction does not change even if the spindle support part 29 and the upper spindle move in the Z direction in a state where the height of the shaft support part 34 in the Z direction is fixed.

A plurality of the engagement parts 37 are provided at the lower spindle 23 in a state of being accommodated within the hollow portion 51A. An engagement part 37 is disposed so as to face another engagement part 37 in a direction orthogonal to the Z direction. The engagement parts 37 re engaged with the engagement grooves 36C of the shaft 36 inserted into the hollow portion 51A.

Each engagement part 7 has a rotating shaft 72 and an engagement part body 74.

The rotating shaft 72 passes through a lower portion of the engagement part body 74 in the direction orthogonal to the Z direction. Accordingly, the engagement part body 74 is configured to be capable of revolving around the rotating shaft 72.

The engagement part body 74 has a hook 74A protruding in a direction toward the axis $O_1$ at an upper end thereof. The hook 74A is engaged with any one engagement groove 36C of the plurality of engagement grooves 36C.

The engagement part 37 having the above configuration is revolved by the engagement part revolving unit (not shown) in a direction approaching the axis $O_1$ and in a direction away from the axis $O_1$.

The second elevating part 38 includes a plurality of cylinders 39 provided between the outer peripheral portion 57A of the plate part 57 (the spindle support part 29) and the outer peripheral portion 66A of the plate part 66 (the shaft support part 34).

Each of the plurality of cylinders 39 includes a piston (not shown), a piston rod 77, and a cylinder body 78.

The piston (not shown) is provided at a piston rod 77 and is accommodated within the cylinder body 78.

The piston rod 77 extends in the Z direction, and has a tip portion connected to the lower surface 66a side of the outer peripheral portion 66A of the plate part 66. The portion of the piston rod 77 where the piston is provided is accommodated within the cylinder body 78. An upper portion of the piston rod 77 protrudes above the cylinder body 78 in a state where the spacer 42 is attached to the shaft 36. That is, when the spacer 42 is removed from the shaft 36, the spindle support part 29 is configured to be capable of being brought closer to the shaft support part 34 by the cylinder 39.

Additionally, by causing the upper portion of the piston rod 77 to protrude upward from the cylinder body 78, it is possible to expose an outer peripheral surface of the shaft 36 from between the rotation support part 59 and the rotation support part 68 to secure a region where the spacer 42 is disposed.

An end of the cylinder body 78 is fixed to an upper surface of the outer peripheral portion 57A of the plate part 57.

As the cylinder 39 having the above configuration, for example, an air cylinder can be used.

Additionally, by constituted the second elevating part 38 of the plurality of cylinders 39, fixing the tip portion of the piston rod 77 to the lower surface 66a of the outer peripheral portion 66A of the plate part 66, and fixing the end of the cylinder body 78 to the upper surface side of the outer peripheral portion 57A of the plate part 57, the upper spindle 32 can be moved in an upward direction without changing the height of the upper surface 66b of the shaft support part 34 by using the second elevating part 38.

Figure 5:
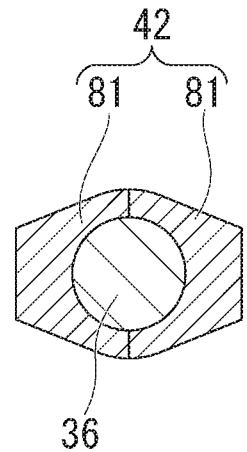
FIG. 5 is a cross-sectional view of a shaft and a spacer shown in FIG. 2 cut in line direction A1-A2.
Figure 6:
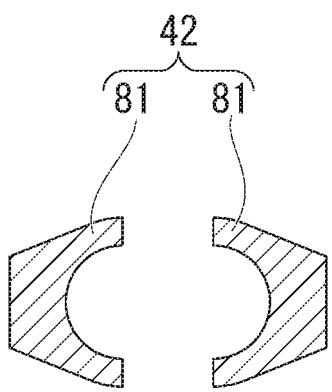
FIG. 6 is a cross-sectional view showing a state where the shaft is removed from the structure shown in FIG. 5 and the two split bodies constituting the spacer are separated.

The spacer 42 will be described with reference to FIGS. 1 to 6. In FIG. 5, the same components as those of the structure shown in FIG. 4 are denoted by the same reference signs. In FIG. 6, the same components as those of the structure shown in FIG. 5 are denoted by the same reference signs.

The spacer 42 is disposed on the outer peripheral surface of the shaft 36 exposed from between the rotation support part 59 and the rotation support part 68. The spacer 42 has two split bodies 81 (in this case, as an example, half bodies). The inside of each split body 81 has such a shape that the split body can conic into contact with the outer peripheral surface of the shaft 36.

A lower end of the rotation support part 68 is in abutment with upper ends of the two split bodies 81. An upper end of the rotation support part 59 is in abutment with lower ends of the two split bodies 81.

The two split bodies 81 are disposed between the rotation support part 68 and the rotation support part 59 by being sandwiched between the rotation support part 68 and the rotation support part 59.

The spacer 42 is a member for adjusting the distance between the shaft support part 34 and the spindle support part 29 (the upper spindle 32) in the Z direction to a predetermined distance.

The height of the two split bodies 81 can be appropriately set according to the predetermined distance.

As described above, by disposing the spacer 42 on the outer peripheral surface of the shaft 36 exposed between the spindle support part 29 and the shaft support part 34, the distance between the spindle support part 29 and the shaft support part 34 is kept constant and accurate.

Additionally, as the spacer 42 includes the plurality of split bodies 81, the spacer 42 can be easily attached to the shaft 36 from the outside of the shaft 36, and can be easily removed from the shaft 36.

Additionally, by shortening the distance between the shaft support part 34 and the spindle support part 29 after the spacer 42 is removed from the shaft 36 in a state where the engagement groove 36C formed at the bottom of the shaft 36 and the engagement part 37 are engaged with each other, the length of the shaft 36 disposed below the upper rim 16 can be increased without increasing the length of the shaft 36.

The spacer opening/closing mechanism (not shown) is configured to be capable of moving each of the two split bodies 81 in a lateral direction. By having the spacer opening/closing mechanism (not shown) having such a configuration, the opening/closing operation of the two split bodies 81 can be easily performed.

A rim replacement device (not shown) is disposed beside the tire holding mechanism 11 having the above configuration. The rim replacement device replaces the lower rim 15 attached to the lower spindle 23 and the upper rim 16 attached to the upper spindle 32 as necessary.

Here, the operation of the Lire holding mechanism 11 will be described with reference to FIGS. 1 to 4.

First, the operation of the tire holding mechanism 11 for achieving the state shown in FIG. 2 will be described.

At the beginning, the lower rim 15 is attached to the lower spindle 23 and the upper rim 16 is attached to the upper spindle 32 by using the rim replacement device (not shown). Next, the tire 5 is conveyed between the tip portion 36A of the shaft 36 and the tubular part 51 in the state shown in FIG. 1 by using a tire conveyor (not shown).

Next, the lower end 36A of the shaft 36 is disposed within the hollow portion 51A in a state where the rim elevator 55 of the first elevating part 27 is moved downward and the lower portion of the shaft 36 passes through the tire 5. In this case, a control is performed such that the engagement groove 36C formed at the top and the hook 74A of the engagement part 37 among the plurality of engagement grooves 36C formed at the lower end 36A are at a position which is capable of engaging. Accordingly, the tire 5 is sandwiched between the upper rim 16 and the lower rim 15.

In this stage, the engagement part 37 is disposed in a direction in which the hook 74A is separated from the axis $O_1$. In other words, an upper portion of the engagement part 37 is opened by the engagement part revolving unit (not shown).

Next, the hook 74A of the engagement part 37 is engaged with the engagement groove 36C formed at the top by closing the upper portion of the engagement part 37 by the engagement part revolving unit (not shown).

Accordingly, the position of the lower end 36A of the shaft 36 is restricted, and the narrow tire 5 is held between the upper rim 16 and the lower rim 15.

Next, the operation of the tire holding mechanism 11 for bringing the state shown in FIG. 2 to the state shown in FIG. 3 will be described.

At the beginning, the upper spindle 32 and the upper rim 16 are moved above the tire 5 by moving the rim elevator 55 of the first elevating part 27 upward. That is, the positional relationship of the upper spindle 32 with respect to the lower spindle 23 is set to the state shown in FIG. 1.

Then, the tire 5 is collected using the tire conveyor. Thereafter, the tire 6 wider than the tire 5 is conveyed to between the tip portion 36A of the shaft 36 and the tubular part 51 by using the tire conveyor.

Next, the lower end 36A of the shaft 36 is disposed within the hollow portion 51A in a state where the rim elevator 55 of the first elevating part 27 is moved downward and the lower portion of the shaft 36 passes through the tire 6. In this case, a control performed such that the engagement groove 36C formed at the bottom and the hook 74A of the engagement part 37 among the plurality of engagement grooves 36C formed at the lower end 36A are at a position which is capable of engaging. Accordingly, the tire 6 is sandwiched between the upper rim 16 and the lower rim 15.

In this stage, the engagement part 37 is disposed in a direction in which the hook 74A is separated from the axis $O_1$. In other words, the upper portion of the engagement part 37 is opened by the engagement part revolving unit (not shown).

In the state shown in FIG. 3, the height of an upper surface 66b of the plate part 66 constituting the shaft support part 34 is higher than the height the height of the upper surface 66b of the plate part 66 shown in FIG. 2 by the distance L between the engagement groove 36C disposed at the bottom of the shaft 36 and the engagement groove 36C disposed at the top.

Next, by closing the upper portion of the engagement part 37 by the engagement part revolving unit (not shown), the hook 74A of the engagement part 37 is engaged with the engagement groove 36C formed at the bottom.

Accordingly, the position of the lower end 36A of the shaft 36 is restricted, and the tire 6 is held between the upper rim 16 and the lower rim 15.

As described above, in FIGS. 2 and 3, the tires 5 and 6 having different widths are disposed between the upper rim 16 and the lower rim 15 by the movement in the Z direction by the first elevating part 27.

In FIG. 3, the engagement groove 36C formed at the bottom among the plurality of engagement grooves 36C is engaged with the hook 74A of the engagement part 37. For this reason, the upper limit value of a tire capable of being held between the upper rim 16 and the lower rim 15 by moving only the first elevating part 27 in the Z direction without replacing the lower rim 15 and the upper rim 16 shown in FIG. 3 is the width of the tire 6.

Next, the operation of the tire holding mechanism 11 for bringing the state shown in FIG. 3 to the state shown in FIG. 4 will be described.

At the beginning, the upper spindle 32 and the upper rim 16 are moved above the tire 7 by moving the rim elevator 55 of the first elevating part 27 upward. That is, the positional relationship of the upper spindle 32 with respect to the lower spindle 23 is set to the state shown in FIG. 1.

Then, the tire 6 is collected using the tire conveyor. Thereafter, the tire 7 wider than the tire 6 is conveyed to between the lower end 36A of the shaft 36 and the tubular part 51.

Next, by further extending the piston rod 77 above the cylinder body 78 from the state shown in FIGS. 2 and 3, the spacing between the rotation support parts 59 and 68 is made larger than the height of the spacer 42.

Next, the split bodies 81 constituting the spacer 42 are moved in the lateral direction (the arrow direction shown in FIG. 4) using the spacer opening/closing mechanism (not shown).

Next, by accommodating the piston rod 77 protruding above the cylinder body 78 in the cylinder body 78, the spindle support part 29 and the upper spindle 32 are moved in the direction toward the rotation support part 68 to cause the upper end of the rotation support part 68 to abut against the lower end of the rotation support part 59.

In this stage, the length of the shaft 36 disposed below the upper rim 16 is longer than the length of the shaft 36 disposed below the upper rim 16 shown in FIGS. 2 and 3 by the height of the spacer 42. In FIG. 4, the position of the lower end 36A of the shaft 36 is disposed at the same position as the position of the lower end 36A of the shaft 36 shown in FIG. 3.

Next, the lower end 36A of the shaft 36 is disposed within the hollow portion 51A in a state where the rim elevator 55 of the first elevating part 27 is moved downward and the lower portion of the shaft 36 passes through the tire 7. In this case, a control is performed such that the engagement groove 36C formed at the bottom and the hook 74A of the engagement part 37 among the plurality of engagement grooves 36C formed at the lower end 36A are at a position which is capable of engaging. Accordingly, the tire 7 having a larger width than the tire 6 is sandwiched between the upper rim 16 and the lower rim 15.

In this stage, the engagement part 37 is disposed in a direction in which the hook 74A is separated from the axis $O_1$. In other words, the upper portion of the engagement part 37 is opened by the engagement part revolving unit (not shown).

Next, by closing the upper portion of the engagement part 37 by the engagement part revolving unit (not shown), the hook 74A of the engagement part 37 is engaged with the engagement groove 36C formed at the bottom.

Accordingly, the position of the lower end 36A of the shaft 36 is restricted, and the tire 7 is held between the upper rim 16 and the lower rim 15.

In the state shown in FIG. 4, the height of the upper surface 66b of the plate part 66 is equal to the height of the upper surface 66b of the plate part 66 shown in FIG. 3. That is, it is possible to suppress an increase in the height of the structure shown in FIG. 4 in a state where the tire 7 having a width larger than the tire 6 is held between the lower rim 15 and the upper rim 16. In other words, it is possible to suppress an increase in the size of the tire holding mechanism 11 in the height direction (Z direction).

As described above, by removing the spacer 42 from the outer peripheral surface of the shaft 36 and moving the spindle support part 29 and the upper spindle 32 in the direction toward the rotation support part 68 by the plurality of cylinders 39, the length of the shaft 36 extending downward from the lower end of the upper rim 16 can be made longer than the structure shown in FIG. 2 without changing the total length of the shaft 36 (that is, without changing the height from the lower end of the shaft 36 to the upper surface 66b of the plate part 66).

Accordingly, since the distance (length) from the lower end of the shaft 36 to the lower end of the upper rim 16 is increased as compared to the structure shown in FIG. 3, the tire 7 wider than the tire 6 can be held between the upper rim 16 and the lower ring 15 without replacing the lower rim 15 and the upper rim 16 from the state shown in FIG. 3.

That is, when the plurality of tires 5 to 7 having the same bead diameter and different widths are held between the upper rim 16 and the lower rim 15, the replacement frequency of the upper rim 16 and the lower rim 15 can be reduced.

Next, the measurement unit 12 will be described with reference to FIGS. 1 to 4.

The measurement unit 12 is a measurement device that measures characteristics of the tires 5 to 7 held by the upper rim 16 and the lower rim 15. The measurement unit 12 includes a rail 85, a moving unit 86, and a load wheel 87.

The rail 85 is provided on the upper surface 21a of the base 21. The rail 85 extends in a direction toward the lower spindle 23.

The moving unit 86 is disposed on the rail 85 so as to be movable on the rail 85.

The load wheel 87 is rotatable provided on the moving unit 86. The load wheel 87 is configured to be movable in the direction in which the rail 85 extends together with the moving unit 86. The load wheel 87 adds a predetermined load to the tires 5 to 7 by approaching the lower spindle 23 only when measurement is carried out.

The characteristics of the tires 5 to 7 measured by the measurement unit 12 having the above configuration may include, for example, a radial force variation (RFV) indicating a variation in a radial force and a lateral force variation (LTV) indicating a variation in an axial force, a tangential force variation (TFV) indicating a variation in the force in a traveling direction, and the like.

According to the tire holding mechanism 11 of the present embodiment, by having the second elevating part 38 that adjusts the length of the shaft 36 protruding below the upper rim 16 by changing the distance between the shaft support part 34 and the upper spindle 32 in the Z direction in addition to the first elevating part 27 that raises and lowers the structure including the spindle support part 29, the upper spindle 32, the shaft support part 34, and the shaft 36 in the Z direction, it is possible to change the length of the shaft 36 protruding below the upper rim 16 without increasing the length of the shaft 36.

Accordingly, since it is possible to hold a wide tire having the same bead diameter, which is difficult to cope with only with the first elevating part 27 without replacing the upper rim 16 and the lower rim 15, the replacement frequency of the upper rim 16 and the lower rim 15 can be reduced.

Additionally, since it is not necessary to increase the length of the shaft 36, it is possible to suppress an increase in the size of the tire holding mechanism in the height direction (Z direction). Accordingly, it is possible to suppress an increase in the size of the tire conveyor, which conveys the tires 5 to 7 to the tire holding mechanism 11, in the height direction.

Additionally, according to the tire test device 10 of the present embodiment, by including the above tire holding mechanism 11 and the measurement unit 12 that measures characteristics of the tires 5 to 7 held between the upper rim 16 and the lower rim 15, it is possible to reduce the replacement frequency of the upper rim 16 and the lower rim 15 when the plurality of tires 5 to 7 having the same bead diameter and different widths are held. Thus, the characteristics of the tires 5 to 7 can be efficiently measured.

In addition, in the present embodiment, as an example, a case where the spacer 42 includes the two split bodies 81 has been described. However, the spacer 42 may include three or more split bodies.

Additionally, the number of cylinders 39 constituting the second elevating part 38 can be appropriately selected.

INDUSTRIAL APPLICABILITY

The present invention is applicable to the tire holding mechanism and the tire test device.

REFERENCE SIGNS LIST 5 to 7 Tire
10 Tire test device
11 Tire holding mechanism
12 Measurement unit
15 Lower rim
15A, 16A Through portion
16 Upper rim
21 Base
21a, 55a, 57a, 66b Upper surface
22 Servo motor
23 Lower spindle
25 Post
27 First elevating part
29 Spindle support part
32 Upper spindle
34 Shaft support part
36 Shaft
36A Lower end
36B Upper end
36C Engagement groove
37 Engagement part
38 Second elevating part
39 Cylinder
42 Spacer
51 Tubular part
51A Hollow portion
53 Ball screw
55 Rim elevator
57, 66 Plate part
57A, 66A Outer peripheral portion
59, 68 Rotation support part
63 Rim holding part
66a Lower surface
72 Rotating shaft
74 Engagement part body
74A Hook
81 Split body
85 Rail
86 Moving unit
87 Load wheel
L Distance
$O_1$ Axis

What is claimed is:

1. A tire holding mechanism comprising:
   an upper spindle that rotatable supports an upper rim abutting against one opening side of a tire from above the upper rim;
   a lower spindle that abuts against the other opening side of the tire, rotatable supports a lower rim holding the tire together with the upper rim, and has a hollow portion formed therein;
   a shaft that passes through the upper spindle, extends in an up-down direction of the upper spindle, protrudes further toward the lower spindle side than the upper rim, and includes a plurality of engagement grooves formed in the up-down direction at an outer periphery of a lower end accommodated in the hollow portion;
   a shaft support part that rotatable supports an upper end of the shaft and extends to an outside of the shaft;
   an engagement part that is provided at the lower spindle in a state of being accommodated within the hollow portion and is engaged with any one engagement groove of the plurality of engagement grooves;
   a first elevating part that is configured to integrally move the upper spindle, the shaft, and the shaft support part in the up-down direction; and
   a second elevating part that is configured to adjust a length of the shaft protruding below the upper rim by changing a distance between the shaft support part and the upper spindle in the up-down direction.

2. The tire holding mechanism according to claim 1, further comprising:
   a spindle support part that is provided below the shaft support part, rotatable supports the upper spindle and the shaft, and has a wider shape than the upper spindle,
   wherein the second elevating part is provided between an outer peripheral portion of the shaft support part and the spindle support part, and is configured to change positions of the spindle support part and the upper spindle with respect to the shaft support part in the up-down direction.

3. The tire holding mechanism according to claim 2,
   wherein the second elevating part includes a piston, a piston rod provided with the piston, and a plurality of cylinders having a cylinder body that accommodates a portion of the piston rod provided with the piston, and
   wherein a tip portion of the piston rod is fixed to a lower surface side of the outer peripheral portion of the shaft support part, and
   wherein an end of the cylinder body is fixed to an upper surface side of an outer peripheral portion of the spindle support part.

4. The tire holding mechanism according to claim 3,
   wherein at least a portion of the piston rod protrudes from the cylinder body,
   wherein an outer peripheral surface of a portion of the shaft is exposed between the shaft support part and the spindle support part,
   wherein a spacer is disposed on an outer peripheral surface of the shaft disposed between the shaft support part and the spindle support part.

5. The tire holding mechanism according to claim 4,
   wherein the spacer includes a plurality of split bodies.

6. A tire test device comprising:
   the tire holding mechanism according to claim 1; and
   a measurement unit that is configured to measure characteristics of the tire held between the upper rim and the lower rim.

* * * * *